(12) United States Patent  
Selgert (10) Patent No.: US 8,123,115 B2  
(45) Date of Patent: Feb. 28, 2012

(54) METHOD AND SYSTEM FOR TRIGGERING NETWORK ACCESS (75) Inventor: Franklin Selgert, Berkel en Rodenrijs (NL)

(73) Assignee: Koninklijke KPN N.V., The Hague (NL)

( * ) Notice: Subject to any disclaimer, the term of this patent is extended or adjusted under 35 U.S.C. 154(b) by 0 days.

(21) Appl. No.: 10/583,820

(22) PCT Filed: Dec. 23, 2004

(86) PCT No.: PCT/EP2004/014743  
§ 371 (c)(1),  
(2), (4) Date: Jun. 21, 2006

(87) PCT Pub. No.: WO2005/064529  
PCT Pub. Date: Jul. 14, 2005

(65) Prior Publication Data  
US 2007/0146121 A1 Jun. 28, 2007

Related U.S. Application Data (60) Provisional application No. 60/532,394, filed on Dec. 24, 2003.

(51) Int. Cl.  
*G06F 17/00* (2006.01)

(52) U.S. Cl. ........................................ 235/375; 235/380
(58) Field of Classification Search .................. 235/375, 235/380  
See application file for complete search history.

(56) References Cited

U.S. PATENT DOCUMENTS 5,650,761 A * 7/1997 Gomm et al. ................ 235/381  
(Continued)

OTHER PUBLICATIONS

Pearson, Ian, "The Future of Superstores", www.btinternet.com/ian.pearson/web/future/superstores.htm, Aug. 2000, pp. 1-3.

(Continued)

*Primary Examiner* — Daniel Hess  
*Assistant Examiner* — Rafferty Kelly  
(74) *Attorney, Agent, or Firm* — McDonnell Boehnen Hulbert & Berghoff LLP (57) ABSTRACT The present invention makes it possible that devices are triggered by RF signals and the owner of the RF chip responsible for the triggering can receive a financial compensation for this. Hereto a method and a system for triggering a first-device by a RF signal and logging the triggering are presented. The system comprises a RF chip of a first party. The first device comprises communication means for receiving a RF signal from the RF chip and communication means for communicating with a network or server of a second party.

3 Claims, 6 Drawing Sheets

U.S. PATENT DOCUMENTS

| | | | |
|---|---|---|---|
| 6,302,461 B1 | 10/2001 | Debras et al. | |
| 6,529,880 B1* | 3/2003 | McKeen et al. | 705/17 |
| 2002/0016750 A1* | 2/2002 | Attia | 705/26 |
| 2002/0030606 A1* | 3/2002 | Chauvin et al. | 340/932.2 |
| 2003/0019942 A1* | 1/2003 | Blossom | 235/492 |
| 2003/0191709 A1* | 10/2003 | Elston et al. | 705/40 |
| 2004/0030601 A1* | 2/2004 | Pond et al. | 705/16 |
| 2005/0071234 A1* | 3/2005 | Schon | 705/22 |

OTHER PUBLICATIONS

"Portable Information Terminal Equipped with RFID Communication Function, Using Method Therefor. and Display Processing Method Therefor," Patents Abstracts of Japan, Pub. No. 2002-269508, Sep. 20, 2002.

"Commodity Information Providing Method By Use of Noncontact IC Tag," Patents Abstracts of Japan, Pub. No. 2003-316873, Nov. 7, 2003.

"Portable Information Processing Device Having a Plurality of Communication Means," Patents Abstracts of Japan, Pub. No. 2003-308497, Oct. 31, 2003.

"On-line Personalization Method and System," Patents Abstracts of Japan, Pub. No. 2002-314524, Oct. 25, 2002.

* cited by examiner

METHOD AND SYSTEM FOR TRIGGERING NETWORK ACCESS

FIELD

The present invention relates to triggering devices by RF signals from RF chips.

BACKGROUND

Chips are becoming smaller and cheaper to produce. This is also the case for chips incorporating radio frequency (RF) modules, which are able to transmit identification signals to receivers that are close enough to receive the RF signals. This type of chips can e.g. be used in supermarkets, where products equipped with such a RF chip can be scanned automatically when passing a check out point. This quickens and eases the payment procedures at the check out point, because the individual products can stay in the basket and are scanned very quickly. The only thing left to do is pay for the products.

In an article from BT Group (see http://www.btplc.com/Innovationandtechnology/Insights/IanPearson/super-stores.htm) the following scenario is given: "Very cheap chips will be built into many things around us in the future. Simple chips in product packaging have already been proposed to enable automatic billing, removing the need for queues at checkouts, or eventually even for the checkout at all. Customers may just load up the trolley and leave, the chips signal to the store computer along with the customer's smart card. Customers would have their accounts automatically debited. Other chips would record information on use-by dates and product type so that home electronics can determine what is available for lunch and what needs replaced on the next shopping trip."

U.S. Pat. No. 6,302,461B1 discloses an electronic identity device such as a transponder being incorporated in a container for collecting waste. A collecting vehicle is provided with appropriate reading and recording means enabling information to be interchanged with the transponder. The collection vehicle can be organized to weigh each container while it is emptying it so as to evaluate the quantity of waste collected there from. The total mass of waste collected during a given period can be stored in the transponder so as to make it possible to bill the user in proportion to the quantity of waste collected as opposed to charging a fixed sum. The transponder can also be useful in managing maintenance operations on the container.

Existing usages of RF chips that send RF signals make the assumption that the RF chip or the product enclosing the RF chip is in the power of the same entity as the device receiving the RF signals. There are scenarios thinkable where this is not the case. In these scenarios the owner of the RF chip may want to receive financial compensation for services offered, i.e. sending RF signals via RF chips. There are no solutions to technically enable this.

PROBLEM DEFINITION

With existing methods and systems it not possible to trigger a device by a RF signal and technically enable financial compensation to an RF chip owner for the triggering.

AIM OF THE INVENTION

It is an aim of the invention to provide a method and system to trigger a device by a RF signal and technically enable financial compensation to the RF chip owner for the triggering.

SUMMARY

The present invention provides a solution to the above-mentioned problems.

According to a first aspect of the invention a system is provided for triggering a first device and logging the triggering. The system can comprise a RF chip of a first party. The first device can comprise communication means for receiving a RF signal from the RF chip. The first device can further comprise communication means for communicating with a network or server of a second party. The first device comprises means to start communicating with the network or server after receiving the RF signal. In other words, the RF signal triggers the first device to start communicating with the network or server of the second party. The first device can comprise means for sending an ID to the RF chip and the RF chip can comprise means for receiving the ID. The ID is e.g. the identity of the customer that is stored in the device. Another example of an ID is a hardware ID of the device. The RF chip can comprise a memory for storing the ID. The RF chip can comprise means for reading the ID from the memory and sending the ID to a second device. The RF chip and the second device can be physically connectable. It is also possible that the RF chip and the second device are wirelessly connectable. The RF chip can comprise means to clear the memory after sending the ID. Billing information can be created based on the ID received in the second device.

According to a second aspect of the invention a system is provided for triggering a first device and logging the triggering. The system can comprise a RF chip of a first party. The first device can comprise communication means for receiving a RF signal from the RF chip. The first device can further comprise communication means for communicating with a network or server of a second party. The first device comprises means to start communicating with the network or server after receiving the RF signal. In other words, the RF signal triggers the first device to start communicating with the network or server of the second party. The RF chip can comprise means for sending an ID to the first device and the first device can comprise means for receiving the ID. The ID is e.g. a hardware ID of the RF chip. The first device can comprise a memory for storing the ID. The first device can comprise means for reading the ID from the memory and sending the ID to a second device. The first device can comprise means to clear the memory after sending the ID. The first device can comprise means for sending on the ID to a second device, i.e. without storing it in a memory. Billing information can be created based on the ID received in the second device.

According to a third aspect of the invention a method is provided for triggering a first device and logging the triggering. The method can comprise the steps of receiving in the first device a RF signal from a RF chip of a first party, the first device starting communicating with a network or server of a second party after receiving the RF signal, sending an ID from the first device to the RF chip, receiving the ID in the RF chip, and storing the ID in a memory of the RF chip. The method can further comprise the step of reading the ID from the memory and sending the ID from the RF chip to a second device. The ID from the RF chip can be sent to the second device via a physical connection. It is also possible that the ID from the RF chip is sent to the second device via a wireless connection. The memory can be cleared after sending the ID. The method can further comprise the step of creating billing information based on the ID received in the second device.

According to a fourth aspect of the invention a method is provided for triggering a first device and logging the triggering. The method can comprise the steps of receiving in the first device a RF signal from a RF chip of a first party, the first device starting communicating with a network or server of a second party after receiving the RF signal, sending an ID from the RF chip to the first device, and receiving the ID in the first device. The method can further comprise the steps of storing the ID in a memory of the first device, reading the ID from the memory and sending the ID to a second device. The memory can be cleared after sending the ID. The method can further comprise the step of sending on the ID from the first device to a second device. The method can further comprise the step of creating billing information based on the ID received in the second device.

BRIEF DESCRIPTION OF THE DRAWINGS

The invention will be explained in greater detail by reference to exemplary embodiments shown in the drawings, in which.

DETAILED DESCRIPTION

For the purpose of teaching of the invention, preferred embodiments of the method and system of the invention are described in the sequel. It will be apparent to the person skilled in the art that other alternative and equivalent embodiments of the invention can be conceived and reduced to practice without departing from the true spirit of the invention, the scope of the invention being only limited by the claims as finally granted.

The present invention makes it possible that devices are triggered by RF signals and the owner of the RF chip responsible for the triggering can receive a financial compensation for this.

Figure 1:
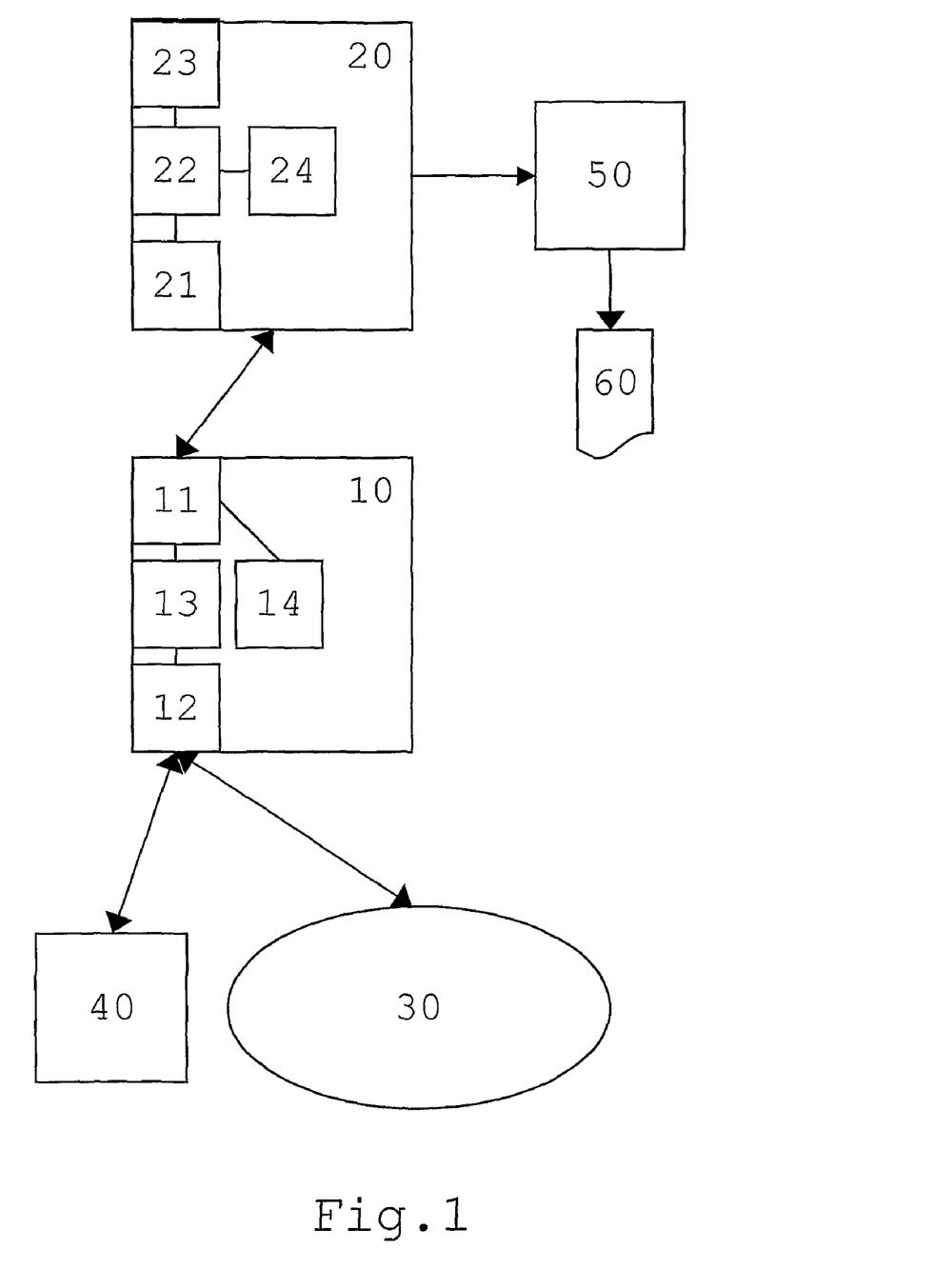
FIG. 1 shows a system according to an exemplary embodiment of the invention.

In FIG. 1 an example of a system according to the invention is shown.

A first device (10) contains four parts: a communication means (11) for receiving a RF signal from a RF chip (20), a communication means (12) for communicating with a network or server, a means (13) to start communicating with the network or server after receiving the RF signal, and a means (14) for sending an ID to the RF chip (20). In this example the communication means (11) for receiving the RF signal is linked to the means (13) to start communicating with the network or server after receiving the RF signal. It is also linked to the means (14) for sending an ID to the RF chip. The means (13) to start communicating with the network or server after receiving the RF signal is also linked to the communication means (12) for communicating with a network (30) or server (40).

The RF chip (20) contains four parts: a means (21) for receiving the ID, a memory (22) for storing the ID, a means (23) for reading the ID from the memory and sending the ID to a second device (50), and a means (24) to clear the memory after sending the ID. The means (21) for receiving the ID is linked to the memory (22) or storing the ID. The memory (22) for storing the ID is linked to the means (23) for reading the ID from the memory and sending the ID to a second device. The memory (22) for storing the ID is also linked to the means (24) to clear the memory after sending the ID.

The second device (50) creates billing information (60) based on the ID received.

Figure 2:
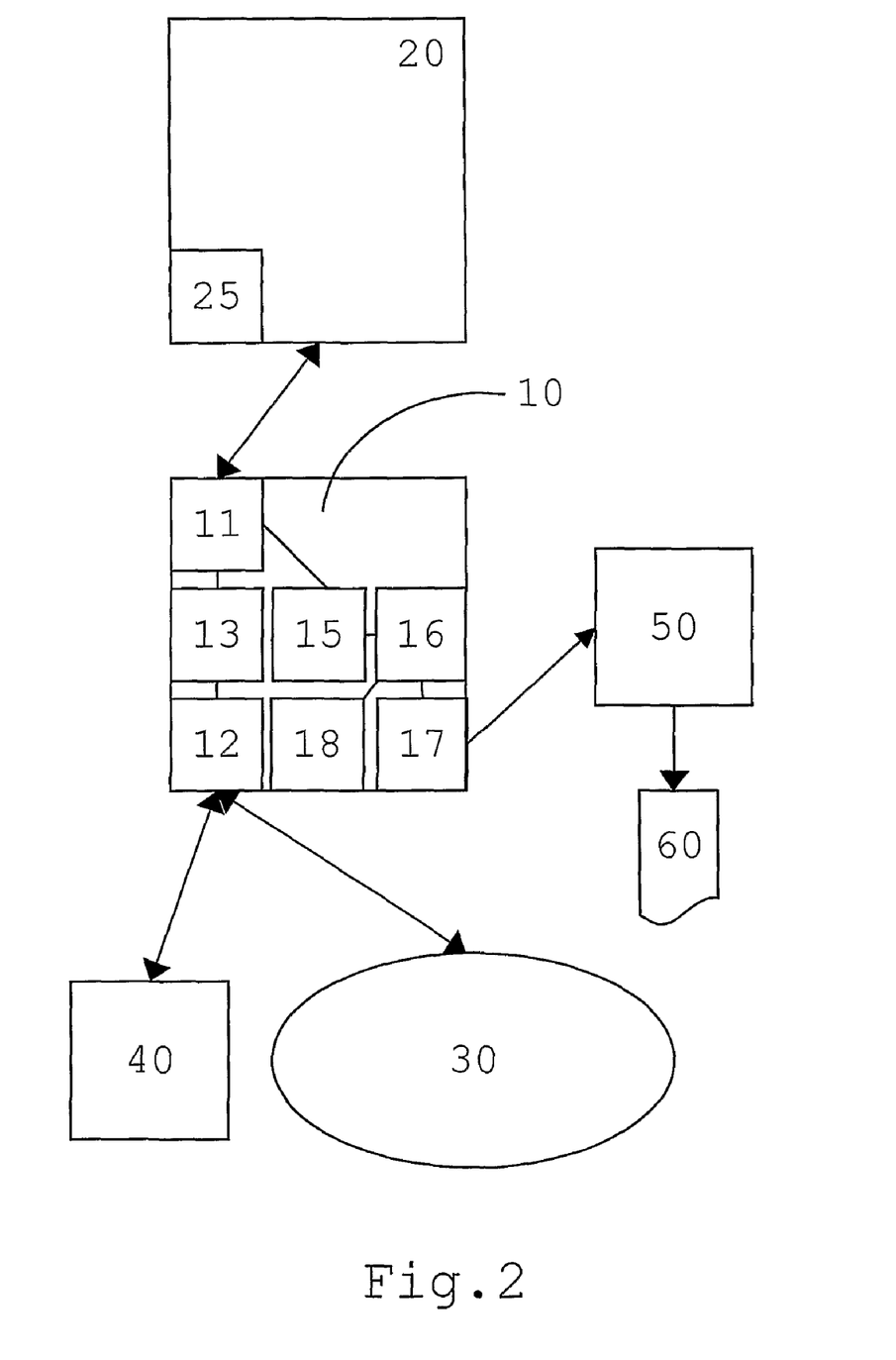
FIG. 2 shows a system according to another exemplary embodiment of the invention.

In FIG. 2 another example of a system according to the invention is shown.

A first device (10) contains seven parts: a communication means (11) for receiving a RF signal from a RF chip (20), a communication means (12) for communicating with a network or server, a means (13) to start communicating with the network or server after receiving the RF signal, a means (15) for receiving an ID from an RF chip (20), a memory (16) for storing the ID, a means (17) for reading the ID from the memory and sending the ID to a second device (50), and a means (18) to clear the memory after sending the ID. In this example the communication means (11) for receiving the RF signal is linked to the means (13) to start communicating with the network or server after receiving the RF signal. It is also linked to the means (15) for receiving the ID from the RF chip. The means (13) to start communicating with the network or server after receiving the RF signal is also linked to the communication means (12) for communicating with a network (30) or server (40). The memory (16) for storing the ID is linked to the means (15) for receiving the ID from the RF chip, to the means (17) for reading the ID from the memory and sending the ID to a second device, and to the means (18) to clear the memory after sending the ID.

The RF chip (20) contains a means (25) for sending the ID to the first device (10).

The second device (50) creates billing information (60) based on the ID received.

Figure 3:
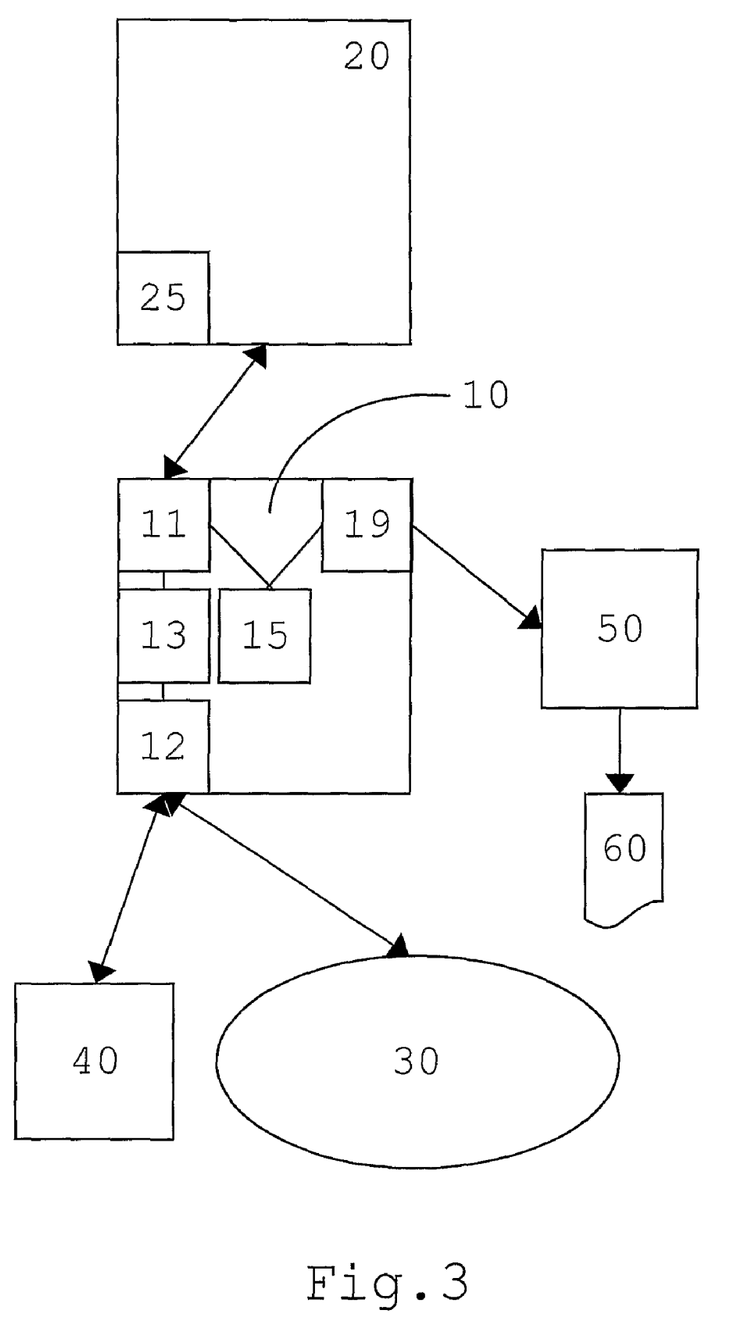
FIG. 3 shows a system according to yet another exemplary embodiment of the invention.

In FIG. 3 yet another example of a system according to the invention is shown.

This example differs from FIG. 2 in that the ID is not stored in a memory. Instead the first device (10) comprises a means (19) for sending on the ID, without logging it in a memory, to the second device (50). The means (19) for sending on the ID to the second device is linked to the means (15) for receiving the ID from the RF chip.

Figure 4:
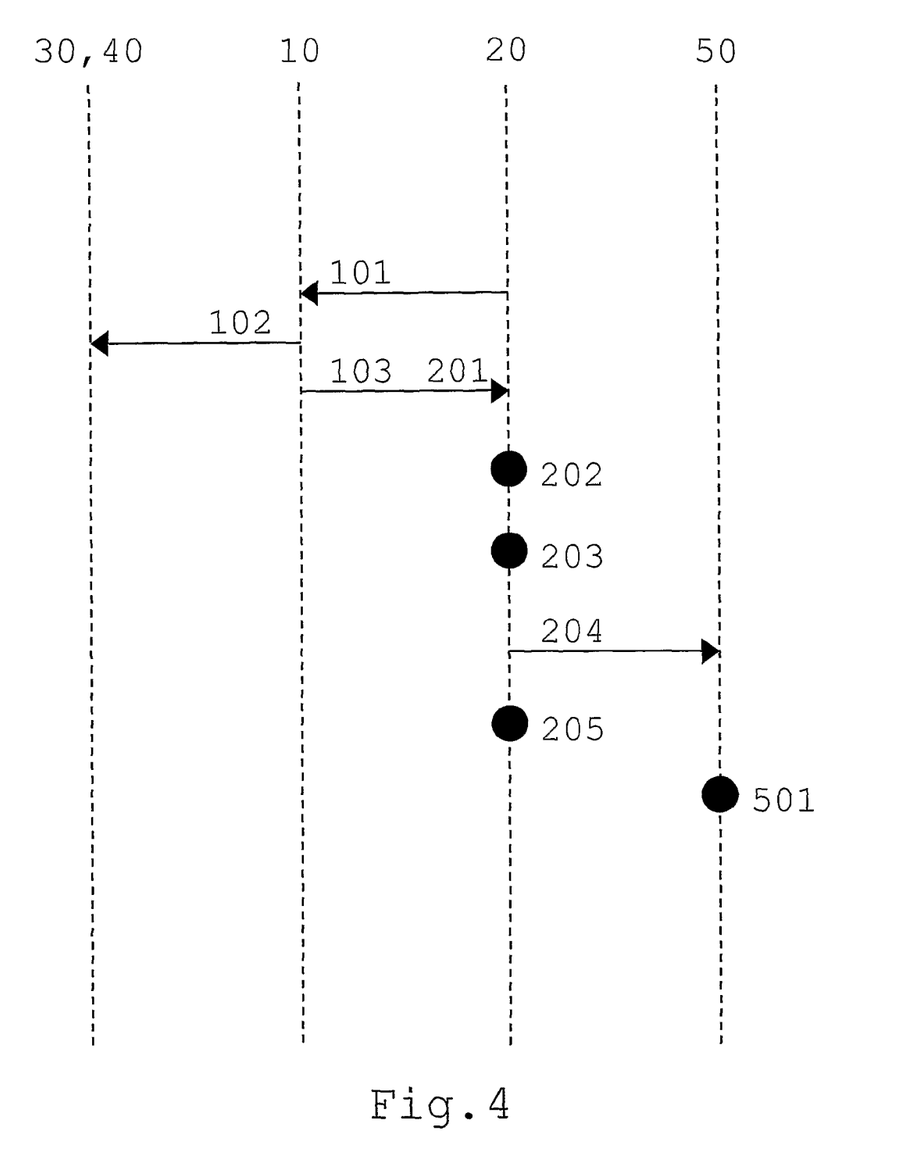
FIG. 4 shows a time-sequence diagram with steps according to an exemplary embodiment of the invention.

In FIG. 4 an example time-sequence diagram is shown with steps that could be taken in the system of the example of FIG. 1. The order of the steps is not limited to the shown example.

The references (30), (40), (10), (20) and (50) are similar to the ones used in FIG. 1. I.e. (30) is a network, (40) is a server, (10) is a first device, (20) is a RF chip and (50) is a second device. The first device receives (101) a RF signal from the RF chip. After receiving the RF signal the first device starts communicating (102) with the network or server. An ID is send (103) from the first device to the RF chip where it is received (201) and stored (202) in a memory. The ID is read (203) from the memory and sent (204) to the second device. Next the memory is cleared (205). In the second device billing information is created (501) based on the ID received in the second device.

Figure 5:
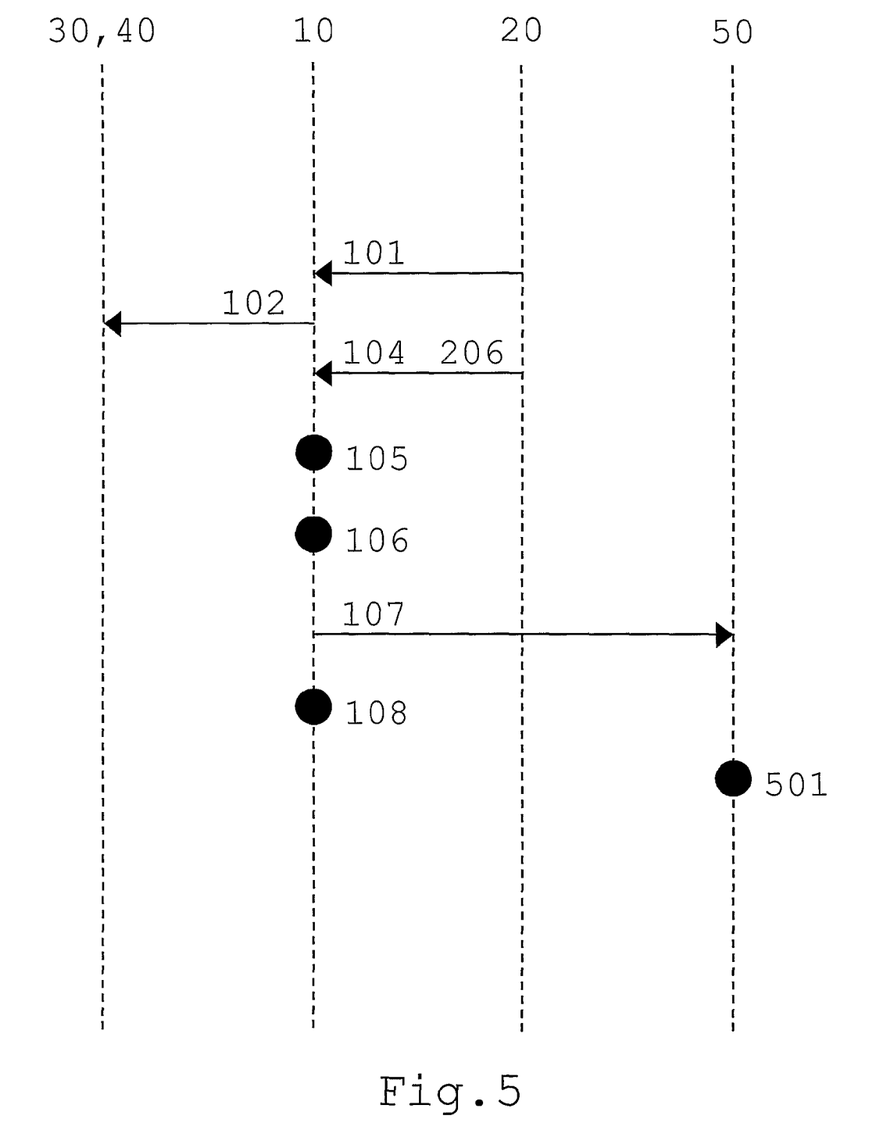
FIG. 5 shows a time-sequence diagram with steps according to another exemplary embodiment of the invention.

In FIG. 5 another example time-sequence diagram is shown with steps that could be taken in the system of the example of FIG. 2. The order of the steps is not limited to the shown example.

The references (30), (40), (10), (20) and (50) are similar to the ones used in FIG. 2. I.e. (30) is a network, (40) is a server, (10) is a first device, (20) is a RF chip and (50) is a second device. The first device receives (101) a RF signal from the RF chip. After receiving the RF signal the first device starts communicating (102) with the network or server. An ID is send (206) from the RF chip to the first device where it is received (104) and stored (105) in a memory. The ID is read (106) from the memory and sent (107) to the second device. Next the memory is cleared (108). In the second device billing information is created (501) based on the ID received in the second device.

Figure 6:
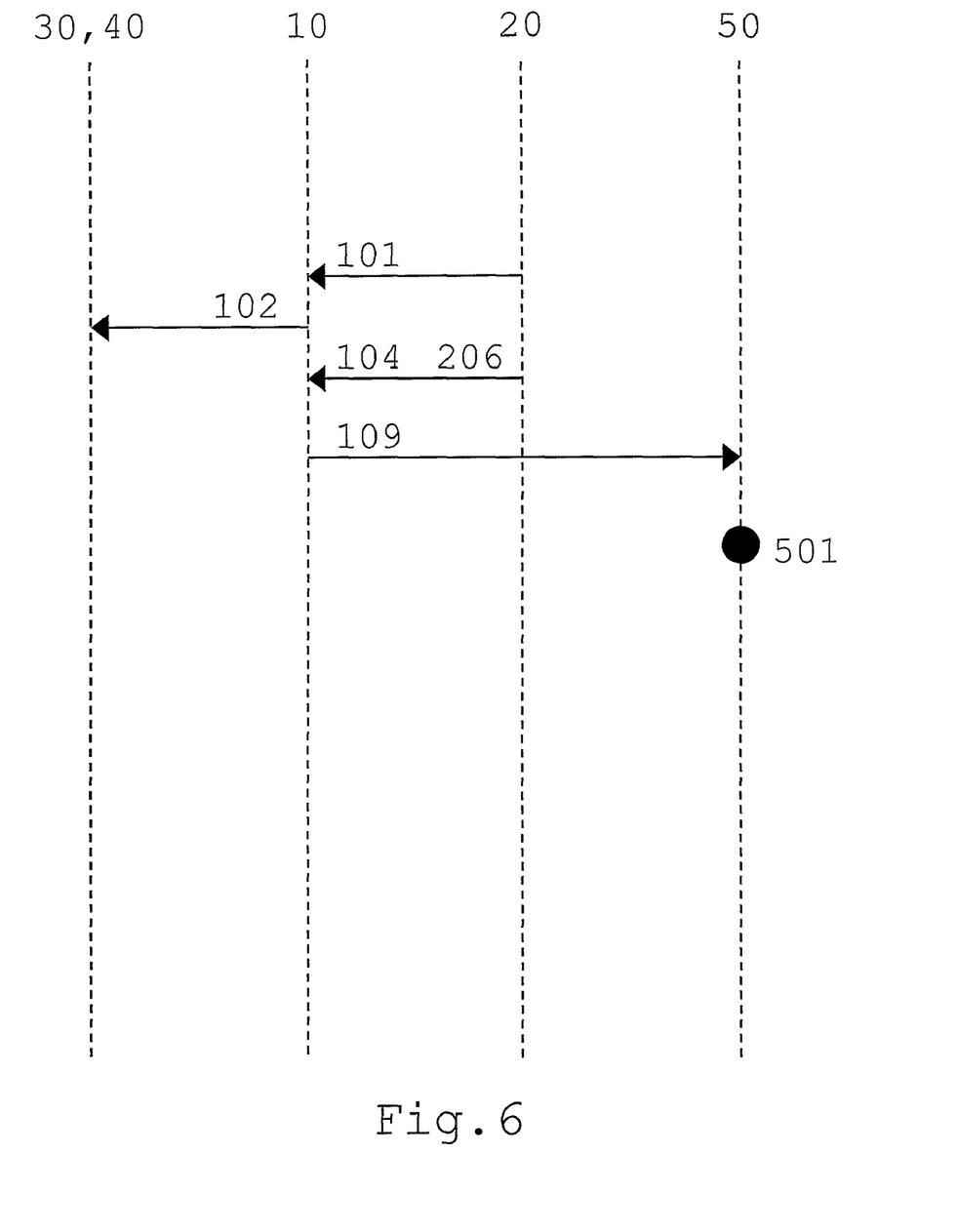
FIG. 6 shows a time-sequence diagram with steps according to yet another exemplary embodiment of the invention.

In FIG. 6 yet another example time-sequence diagram is shown with steps that could be taken in the system of the example of FIG. 3. The order of the steps is not limited to the shown example.

The references (30), (40), (10), (20) and (50) are similar to the ones used in FIG. 3. I.e. (30) is a network, (40) is a server, (10) is a first device, (20) is a RF chip and (50) is a second device.

This example differs from FIG. 5 in that the ID is not stored in a memory. After the ID is send (206) from the RF chip to the first device where it is received (104), the ID is send on (109) from the first device to the second device.

To describe the invention in more detail an example is given. Assume that in a supermarket all products are equipped with a RF chip. Each RF chip transmits a unique signal identifying the product. A customer walking through the store can receive the RF signals on a personally owned device, e.g. a PDA, notebook, mobile phone or any other wearable/mobile device. When the customer is close enough to a product, the personal device receives the unique signal from the RF chip in the product and starts a program to receive more information about the product. Hereto a connection is made to, e.g., the Internet where an Internet site hosting product information can be found. When the personal device has retrieved the information, the customer can read on the display all kinds of information about the product.

Another example is the usage of RF chips to trigger devices to use a specific network. Assume that there is a street in which a multitude of wireless networks are available. An UMTS network of operator A is covering the whole city, thus covering this street. A Wireless LAN (WLAN) network owned by local provider B covers half of the street. The whole street is provided with street-lamps owned by the city. The street-lamps in the part of the street covered by the WLAN network are fitted with RF chips sending out a signal identifying the WLAN network of local operator B. Because the RF chips are fitted in the street-lamps, the city owns the RF chips. A customer with a dual mode UMTS/WLAN device walks through the street. The device is connected to the UMTS network. When the device comes in the proximity of the street-lamps with RF chips the device detects the RF signal and knows that there is a WLAN network available. Because the WLAN network is faster and cheaper the owner of the device prefers to switch from the UMTS network to the WLAN network. The device does this automatically. On receiving the RF signal the device closes the connection with the UMTS network and connects to the WLAN network.

Yet another example is related to location specific information. Assume that the same kinds of street-lamps are used as in the previous example. This time the RF signals are not used for WLAN triggering though. The street-lamps are located near tourist sites and each RF chip sends out a signal related to a tourist site close to the street-lamp. When a tourist comes close to a street-lamp with an RF chip, the personal device receives the RF signal and starts to make a connection to a server on the Internet. From this server information is downloaded to the personal device about the tourist site at the location of the street-lamp.

Another example shows the use of a RF chip for maintenance purposes. Assume that the street-lamps equipped with RF chips in the example of WLAN triggering have a second RF chip. This second chip sends out a RF signal only when the street-lamp needs maintenance, e.g. because the light bulb is broken. Of course it is also possible to use only one RF chip capable of sending two distinct RF signals. The maintenance RF signal is picked up by a device connected to the WLAN network, which sends a report via the WLAN network to the street-lamp support division of the city.

In all examples two communication paths can be identified. Firstly there is the communication path between the RF chip and a device picking up the RF signal. Secondly there is a data connection between the device and a server connected to a data network (data connections are commonly used, but is possible to use any other kind of connection over any other network). To be able to use the second communication path, the customer (which can be a person or any another legal entity) generally has a subscription and pays for the amount of data transported. The paid for traffic over the second communication path would not have been there if the RF chip didn't trigger the device. Therefore it is fair that the entity that is in control of or owns the RF chip receives a financial compensation for each triggering resulting in data traffic over the second communication path.

The present invention makes it possible to log every trigger. This can be done in three ways.

The first possibility is to have the RF chip store the ID of the device that is being triggered. This can be achieved by incorporating a handshake protocol in the RF chip and in the device. This handshake protocol is used to send the RF signal to the device and have the device send its ID, or the ID of the customer related to the device, back to the RF chip. The RF chip stores the ID in a log file in memory. Periodically the log file is send to the provider of the second communication path. To achieve this, the RF chip can be connected to a device capable of sending the information via any communication path to the provider. After sending, the memory can be cleared. It is also possible to read the log file by passing the RF chip with a log-file-read-out device. In this case one has to come close enough to the RF chips that need to be read out. If the signal of the RF chip is strong enough, one may drive past the RF chips by car and read out the log file, possibly clearing the memory thereafter.

The second possibility is to have the personal device that receives the RF signal store an ID of the RF chip. In this case a log file is stored in the memory of the personal device. This log file is periodically sent to the provider of the second communication path.

A third possibility is to have the personal device that receives the RF signal send the ID of the RF chip to the provider of the second communication path immediately. The result of having the RF chip usage logged is that the RF chip owner and detailed usage statistics are now known to the provider of the second communication path. This enables a financial compensation for each trigger to the owner of the RF chip.

The invention claimed is:

1. A system comprising:
    a customer device configured to receive an RF signal from an RF chip via a first communication path, and responsively (i) start communicating with a communication network via a second separate communication path and (ii) send an enabling ID to the RF chip, the enabling ID uniquely identifying the customer device to the RF chip,
    the RF chip configured to transmit the RF signal to the customer device via the first communications path, receive the enabling ID from the RF chip, and store the enabling ID; and
    means for causing an entity associated with the RF chip to be financially compensated by a communication provider associated with the communication network for the network communications of the device triggered by the RF chip, based at least in part on the enabling ID, wherein the RF signal transmitted from the RF chip to the customer device via the first communications path comprises a link to information associated with a product to which the RF chip is attached.

2. A system comprising:

a customer device configured to receive an RF signal and an enabling ID from an RF chip via a first communication path, and responsively start communicating with a communication network via a second separate communication path, the RF chip comprising means for sending the enabling ID to the customer device, the enabling ID uniquely identifying the RF chip to the customer device; and means for causing an entity associated with the RF chip to be financially compensated by a communication provider associated with the communication network for the network communications of the customer device triggered by the RF chip, based at least in part on the enabling ID, wherein the RF signal transmitted from the RF chip to the customer device via the first communications path comprises a link to information associated with a product to which the RF chip is attached.

3. A method for triggering a customer device and logging the triggering, the method comprising:

receiving at the customer device and via a first communication path an RF signal and an enabling ID from an RF chip associated with an entity, the enabling ID uniquely identifying the RF chip to the customer device;

responsive to receiving the RF signal, the customer device starting communicating via a second separate communication path with a communication network associated with a communication provider different from the entity; and causing the entity to be financially compensated by the communication provider for the network communications of the customer device triggered by the RF chip, based at least in part on the received enabling ID, wherein the RF signal transmitted from the RF chip to the customer device via the first communications path comprises a link to information associated with a product to which the RF chip is attached;

the method further comprising the customer device accessing the link via the second separate communication path and retrieving information associated with the product.

* * * * *